United States Patent [19]
Fujita et al.

[11] Patent Number: 5,379,874
[45] Date of Patent: Jan. 10, 1995

[54] FLUID PRESSURE CONTROL DEVICE FOR AN AUTOMATIC TRANSMISSION IN A VEHICLE

[75] Inventors: Kenjiro Fujita, Kusatsu; Akihiro Kondo, Kyoto; Toyoji Ohnishi, Kameoka; Yoshio Hasegawa; Mitsuru Yuge, both of Kyoto, all of Japan

[73] Assignee: Mitsubishi Jidosha Kogyo Kabushiki Kaisha, Tokyo, Japan

[21] Appl. No.: 60,993

[22] Filed: May 14, 1993

[30] Foreign Application Priority Data

May 19, 1992 [JP] Japan ................... 4-126036

[51] Int. Cl.6 ........................... F16D 25/14
[52] U.S. Cl. ................... 192/85 R; 192/85 AA
[58] Field of Search ............ 192/85 R, 85 A, 85 AA; 137/625.69, 855, 533.11

[56] References Cited

U.S. PATENT DOCUMENTS

| 2,061,830 | 11/1936 | Campbell . | |
| 3,683,618 | 8/1972 | Schacher et al. | 192/85 R X |
| 3,785,157 | 1/1974 | Kittle et al. | 192/85 R X |
| 3,923,133 | 12/1975 | Chivari | 192/85 R |
| 3,964,506 | 6/1976 | Grundman | 192/113 BT X |
| 4,471,812 | 9/1984 | Bertsch | 137/855 |
| 4,524,805 | 6/1985 | Hoffman . | |
| 4,611,699 | 9/1986 | Takao | 192/85 R X |
| 4,657,041 | 4/1987 | Mitsui | 192/85 R X |
| 4,886,093 | 12/1989 | Itakura et al. | 137/855 |
| 4,887,512 | 12/1989 | Leising et al. | 192/85 A X |
| 4,947,974 | 8/1990 | Smemo et al. | 192/113 BT X |
| 5,137,049 | 8/1992 | Orlowski | 137/533.11 |
| 5,168,973 | 12/1992 | Asayama et al. | 192/85 R |

FOREIGN PATENT DOCUMENTS

| 35320 | 11/1908 | Germany . | |
| 1750501 | 1/1971 | Germany . | |
| 7413011 | 7/1974 | Germany . | |
| 1105223 | 5/1986 | Japan . | |
| 1-131326 | 5/1989 | Japan | 192/85 R |
| 3020161 | 1/1991 | Japan . | |
| 4249648 | 9/1992 | Japan . | |

Primary Examiner—Andrea L. Pitts

[57] ABSTRACT

A fluid pressure control device is equipped with a valve body which has an input port connected to a hydraulic fluid source, an output port which is connected to a pressure chamber of a clutch of an automatic transmission, and a discharge port. It further includes a solenoid valve which is incorporated in the valve body and has a valve spool designed to selectively connect the output port to the input port or the discharge port. A discharge passage extends from the discharge port of the valve body, the discharge passage having a discharge port which is positioned at a higher level than the liquid level of the oil pan of the automatic transmission. Finally, a reed valve acts to close the discharge port of the discharge passage to maintain fluid at the aforementioned higher level, and allows the discharge of the hydraulic fluid only through the discharge port.

37 Claims, 7 Drawing Sheets

FLUID PRESSURE CONTROL DEVICE FOR AN AUTOMATIC TRANSMISSION IN A VEHICLE

DESCRIPTION OF THE RELATED ART

1. Field of the Invention

The present invention relates to a fluid pressure control device which controls a hydraulic fluid supplied to a frictional engagement element in an automatic transmission in a vehicle.

2. Background of the Invention

An automatic transmission in a vehicle incorporates a plurality of frictional engagement elements such as clutches and brakes. These frictional engagement elements are selectively switched between an engaged state and a disengaged state, and the switching determines the gear ratio of the automatic transmission.

In general, the frictional engagement element is actuated by the hydraulic fluid supplied from the fluid pressure control device, the pressure of the hydraulic fluid being adjusted to a specified level by the fluid pressure control device.

The fluid pressure control device is equipped with a hydraulic pump which is driven by an engine of the vehicle, a pressure-regulating valve which reduces the pressure of the hydraulic fluid discharged from the hydraulic pump to a specified line pressure, a valve body which incorporates a part of a supply passage of the hydraulic fluid sent to frictional engagement element and a part of a discharge passage of the hydraulic fluid returned from the frictional engagement element, and a solenoid valve which is attached to the valve body and which opens or closes the above-mentioned supply passage and discharge passage in the valve body to control the supply of the line pressure to the frictional engagement element.

Normally, the valve body is located in an oil pan of the automatic transmission and it is arranged so that the aforesaid supply passage and discharge passage inside the valve body are immersed in the hydraulic fluid in the oil pan. In this case, the oil pan is located at the bottom inside the automatic transmission.

When the valve body is immersed in the hydraulic fluid, the hydraulic fluid in the supply passage or discharge passage in the valve body will not go out of the valve body even if the vehicle is left unoperated for a long period of time.

Some automatic transmissions, however, have the valve body as well as the aforesaid oil pan sideways with respect to the automatic transmission to obtain an ample space below the automatic transmission and avoid interference with the wheel drive shafts, suspensions or other automotive parts. In this case, the axis of the valve body extends vertically, and therefore, the valve body is stood up in the automatic transmission.

In the case of such a standing valve body, the discharge passage extends upward and the discharge port thereof Is positioned at the highest level of the entire fluid pressure control device, i.e., higher than the liquid level in the oil pan, with the discharge port being opened to the atmosphere.

As described above, positioning the discharge port of the discharge passage at a higher level than the liquid level of the oil pan keeps the discharge passage and the supply passage in the valve body filled with the hydraulic fluid after the hydraulic fluid has discharged from the frictional engagement element via the discharge passage. This leads to improved responsiveness of the frictional engagement element in its action when the hydraulic fluid is subsequently supplied to the frictional engagement element.

In the fluid pressure control device described above, the frictional engagement element is rotated as the engine is driven even though the valve body is fixed. For this reason, it is necessary to install seal rings, which liquid-tightly connects fixed parts and rotary parts in the supply passage and discharge passage which extend from the valve body to the frictional engagement element.

To be more specific, the fixed parts and the rotary parts of the passages are connected through the relative rotary surfaces between the rotary shaft and the casing of the automatic transmission. The seal rings are located between these relative rotary surfaces.

However, the discharge port of the discharge passage is opened to the atmosphere. Therefore, if the discharge passage is left open for a long period of time, then the hydraulic fluid will leak through the seal rings, which are susceptible to wear, or through the gap between the valve body and the valve spool of the solenoid valve inserted in the valve body.

SUMMARY OF THE INVENTION

An object of the present invention is to provide a fluid pressure control device for an automatic transmission for a vehicle which is capable of preventing hydraulic fluid from going out and also improving sealing performance thereof.

The object Is achieved by the fluid pressure control device according to the present Invention which is applied to an automatic transmission which has a frictional engagement element and a reservoir section for storing the hydraulic fluid to be supplied to the frictional engagement element. The fluid pressure control device comprises a supply means which supplies the hydraulic fluid to the frictional engagement element, the supply means having a supply passage which connects the reservoir section and the foregoing frictional engagement element; a discharge passage through which the hydraulic fluid is discharged from the frictional engagement element, the discharge passage having a discharge port which is positioned at a level higher than the liquid level of the reservoir section; a change-over valve which Is located at a higher level than the liquid level of the reservoir section and which selectively connects one of the supply passage and discharge passage for the frictional engagement element; and a check valve means which allows the discharge of the hydraulic fluid only through the discharge port of the discharge passage and which prevents air from entering the discharge passage through the discharge port.

According to the fluid pressure control device described above, when the discharge passage is connected to a frictional engagement element via the change-over valve, the hydraulic fluid in the frictional engagement element is discharged through the discharge port of the discharge passage via the check valve device. As soon as the discharge of the hydraulic fluid from the frictional engagement element is completed, the check valve device closes the discharge port of the discharge passage.

In this case, even if the change-over valve is kept in the rest position, wherein the discharge passage is connected with the frictional engagement element, for a long period of time, the check valve device securely prevents the discharge port of the discharge passage from being opened to the atmosphere.

Thus, the hydraulic fluid does not leak through the above-mentioned seal rings, the gap between the valve element of the change-over valve and the valve body, or a gap in the structure of the frictional engagement element.

Accordingly, the parts of the passages from the change-over valve to frictional engagement element is always filled with the hydraulic fluid. This makes it possible to immediately supply the hydraulic fluid to the frictional engagement element via the supply passage when the change-over valve is switched from the rest position to the actuated position next time, thus resulting in improved responsiveness of the frictional engagement element in its action.

These and other objects of the present application will become more readily apparent from the detailed description given hereinafter. However, it should be understood that the detailed description and specific examples, while indicating preferred embodiments of the invention, are given by way of illustration only, since various changes; and modifications within the spirit and scope of the invention will become apparent to those skilled in the art from this detailed description.

BRIEF DESCRIPTION OF THE DRAWINGS

The present invention will be better understood from the detailed description given herein below and the accompanying drawings which are given by way of illustration only, and thus, are not limitative of the present invention, and wherein.

DETAILED DESCRIPTION OF THE PREFERRED EMBODIMENTS

Figure 1:
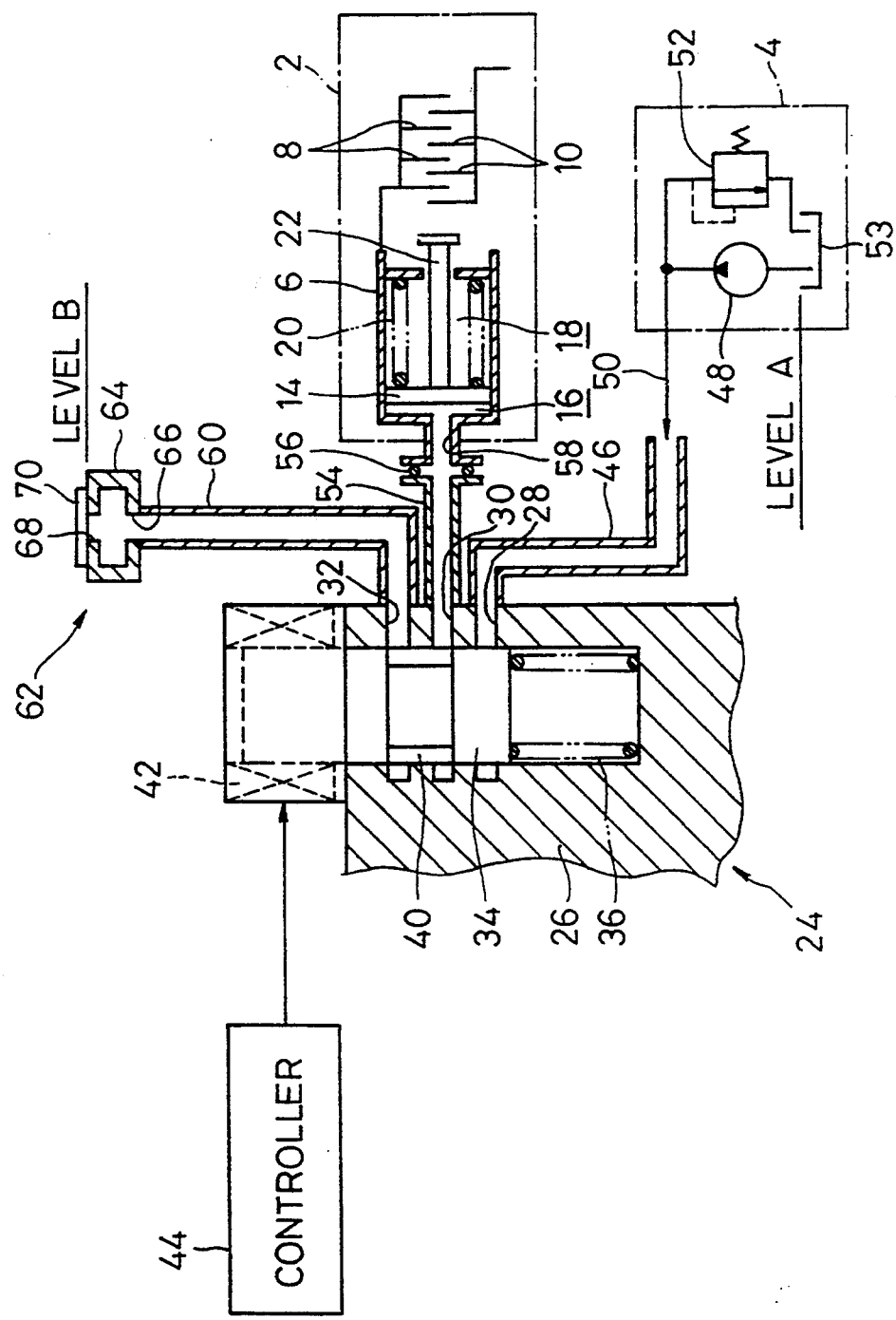
FIG. 1 shows a part of a fluid pressure control device which is applied to an automatic transmission.

Referring to FIG. 1, a part of a hydraulic supply system used for an automotive automatic transmission, i.e. a fluid pressure control device covering a hydraulic source 4 and as far as a hydraulic multiple-disc clutch 2, is shown.

The clutch 2 is attached to an input shaft of the automatic transmission, and it is provided with a clutch retainer 6 which rotates as one piece with the input shaft, a plurality of clutch plates 8 which are provided on the clutch retainer 6, a plurality of clutch discs 10 which are located among the clutch plates 8 and which are linked to the output shaft side of the automatic transmission, and a clutch piston 14 incorporated in the clutch retainer 6.

The clutch piston 14 partitions the clutch retainer 6 into a pressure chamber 16 and a spring chamber 18. The spring chamber 18 contains a return spring 20, and the return spring 20 urges the clutch piston 14 toward the pressure chamber 16. In the case of this embodiment, the clutch piston 14 has a piston rod 22 which extends out of the clutch retainer 6 through the spring chamber 18.

When the pressure in the pressure chamber 16 is built up, the clutch piston 14 moves to the right in FIG. 1 and causes the clutch plates 8 and the clutch discs 10 to be frictionally engaged via the piston rod 22. As a result, the automatic transmission is shifted upward or downward. After that, the moment the pressure chamber 16 is released to a low-pressure side, the clutch piston 14 moves toward the pressure chamber 16 due to the urging force applied by the return spring 20, releasing the frictional engagement between the clutch plates 8 and the clutch discs 10. As a result, the automatic transmission is shifted downward or upward.

In the case of the example shown, the clutch piston 14 is provided with the piston rod 22, however, in the actual clutch 2, the clutch plates 8 and the clutch discs 10 are frictionally engaged by the clutch piston 14 itself.

The fluid pressure control device is equipped with a valve body 26 and the lengthwise axis of the valve body 26 extends along the height of the casing (not shown) of the automatic transmission. In other words, the valve body 26 is stood up along the casing of the automatic transmission.

The valve body 26 has an input port 28, output port 30, and a discharge port 32 as observed from the bottom side in FIG. 1. These ports are opened and closed by a valve spool 34 of a solenoid valve 24.

The valve spool 34 is inserted in a cylinder bore 27 defined In the valve body 26. Inside the cylinder bore 27 is provided a valve spring 36 which urges the valve spool 34 upward as observed in FIG. 1 and sets the solenoid valve 24 In the rest position.

The valve spool 34 has an annular groove 40 on its periphery. When the valve spool 34 is in the rest position, the output port 30 and the discharge port 32 are connected via the annular groove 40 of the valve spool 34, the input port 28 and the output port 30 being disconnected by the peripheral surface of the valve spool 34.

The solenoid valve 24 has a solenoid 42 which is arranged so that it protrudes out from the top surface of the valve body 26 and the solenoid 42 is electrically connected to the controller 44. When the controller 44 excites the solenoid 42, the solenoid 42 pushes the valve spool 34 down as observed in FIG. 1 against the urging force of the valve spring 36, causing the valve spool 34 to shift from the rest position to the actuated position. When the valve spool 34 is in the actuated position, the input port 28 and the output port 30 are connected via the annular groove 40 of the valve spool 34, while the output port 30 and the discharge port 32 are disconnected by the peripheral surface of the valve spool 34.

The solenoid valve 24 illustrated is of the normal closed type but it may be of the normal open type. In this case, as long as the solenoid is unexcited, the input port 28 and the output port 30 are connected, while the output port 30 and the discharge port 32 are disconnected, that is, the solenoid valve is open. When the solenoid is excited, the solenoid valve is closed and then the input port 28 and the output port 30 are disconnected, while the output port 30 and the discharge port 32 are connected.

The input port 28 of the valve body 26 is connected to the hydraulic source 4 via a pressure passage 46. The hydraulic source 4 comprises a hydraulic pump 48 driven by the engine (not shown) of a vehicle, a line pressure passage 50 connecting the discharge port of the hydraulic pump 48 and the pressure passage 46, a pressure regulating valve 52 which maintains the discharge pressure of the hydraulic pump 48, i.e., the line pressure in the passage 50 at a constant level, and an oil pan 53, which is installed so that it covers the entire valve body 26, in the automatic transmission.

A pressure passage 54 extends from the output port 30 of the valve body 26 and the end of the pressure passage 54 is connected to a pressure passage 58 on the side of the clutch 2 via a seal ring 56. The pressure passage 58 is always connected to the pressure chamber 16 of the clutch 2.

Since the clutch 2, i.e., the clutch retainer 6, is rotated with respect to the casing of the automatic transmission, i.e., the valve body 26, the pressure passage 46 extending from the valve body 26 must be connected with the pressure passage 58 on the clutch retainer side through sliding surfaces that are relatively rotated. The seal ring 56 is required to seal the sliding surfaces against each other.

A discharge passage 60 extends from the discharge port 32 of the valve body 26, the top end of the discharge passage 60 being positioned at level B which is higher than level A of the liquid surface in the oil pan 53 in the hydraulic source 4 mentioned above.

More specifically, the discharge passage 60 extends upward from the discharge port 32 and the top end thereof is positioned at a higher level than the solenoid valve 24 and the clutch 2. Also, the valve body 26 is located so that at least the solenoid valve 24 is positioned higher than liquid surface level A of the oil pan 53 or the entire valve body 26 is positioned at a higher level than liquid surface level A.

In FIG. 1, the pressure passages 46 and 54 are illustrated as conduits extended from the valve body 26 for the convenience of drafting the figure, however, these pressure passage 46 and 54 are defined in the valve body 26 and the casing of the automatic transmission.

A hydraulic fluid trap 62 is provided on the top end of the discharge passage 60. As shown in the enlarged figure of FIG. 2, the hydraulic fluid trap 62 has a trap box 64. The trap box 64 is connected to the discharge passage 60 through a port 66 in its bottom wall.

Figure 3:
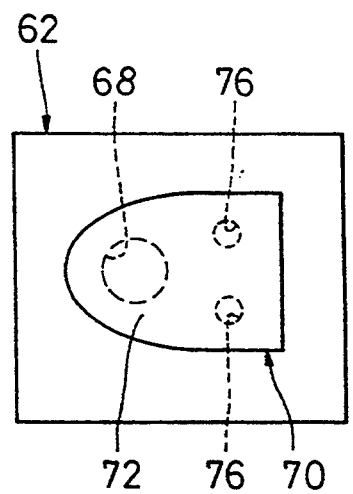
FIG. 3 is a plan view of the reed valve of FIG. 2.

The top wall of the trap box 64 has a discharge port 68. The discharge port 68 is closed by a reed valve 70 from outside. As it is obvious from FIG. 3, the reed valve 70 has a tongue-shaped valve element 72 and the valve element 72 is made of an elastic material (e.g., rubber).

A pair of mounting feet 74 is formed as one piece at the root of the valve element 72. These mounting feet 74 are inserted airtightly in a mounting hole 76 formed in the top wall of the trap box 64. Further, at the lower end of the mounting feet 74 is provided a retaining part 78 having a diameter, which is larger than that of the mounting hole 76. The retaining part 78 prevents the reed valve 70 from coming off the trap box 64.

It is assumed that, when the fluid pressure control device is in the state shown in FIG. 1, the path from the hydraulic source 4 to the pressure chamber 16 of the clutch 2 via the solenoid valve 24, the discharge passage 60, and the hydraulic fluid trap 62 are filled with the hydraulic fluid.

Figure 4:
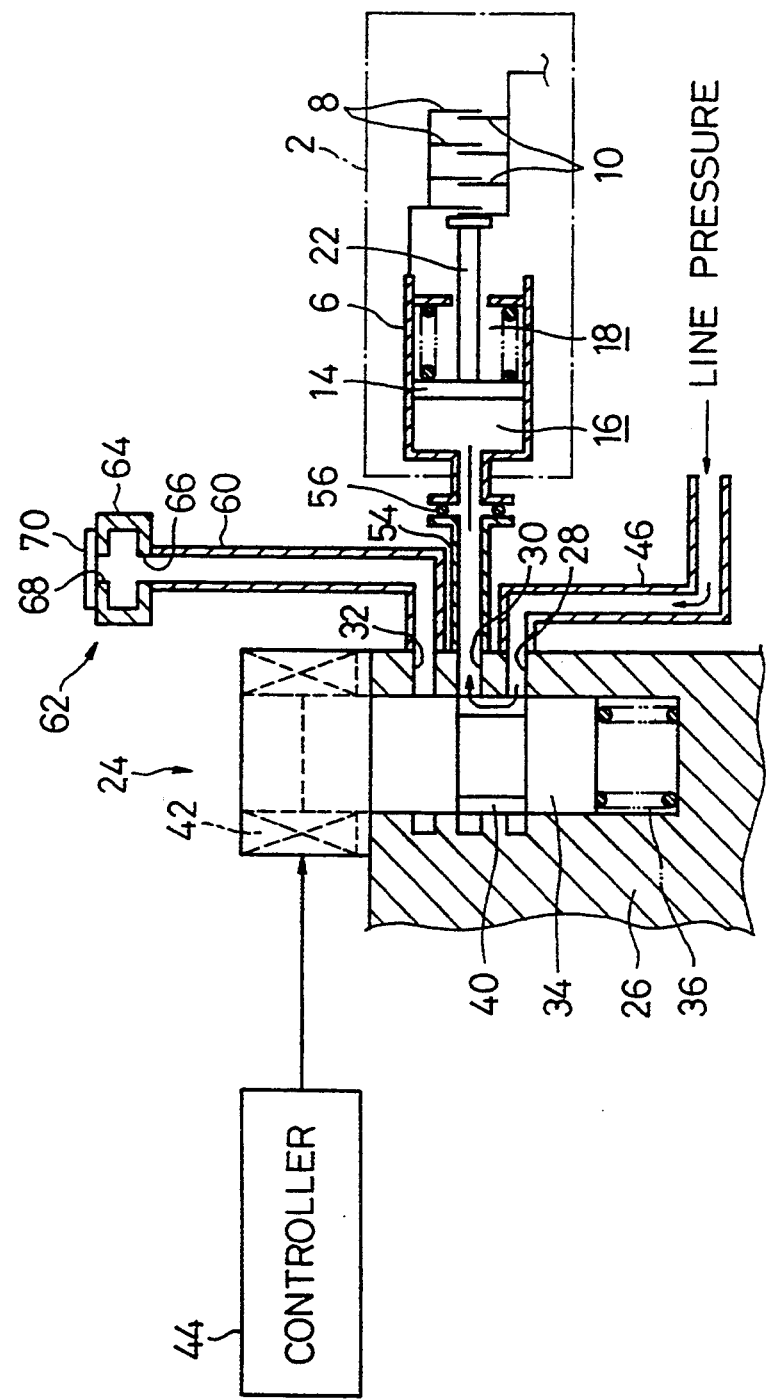
FIG. 4 shows a condition where the solenoid valve of FIG. 1 is in the actuated position while the solenoid is being energized.
Figure 5:
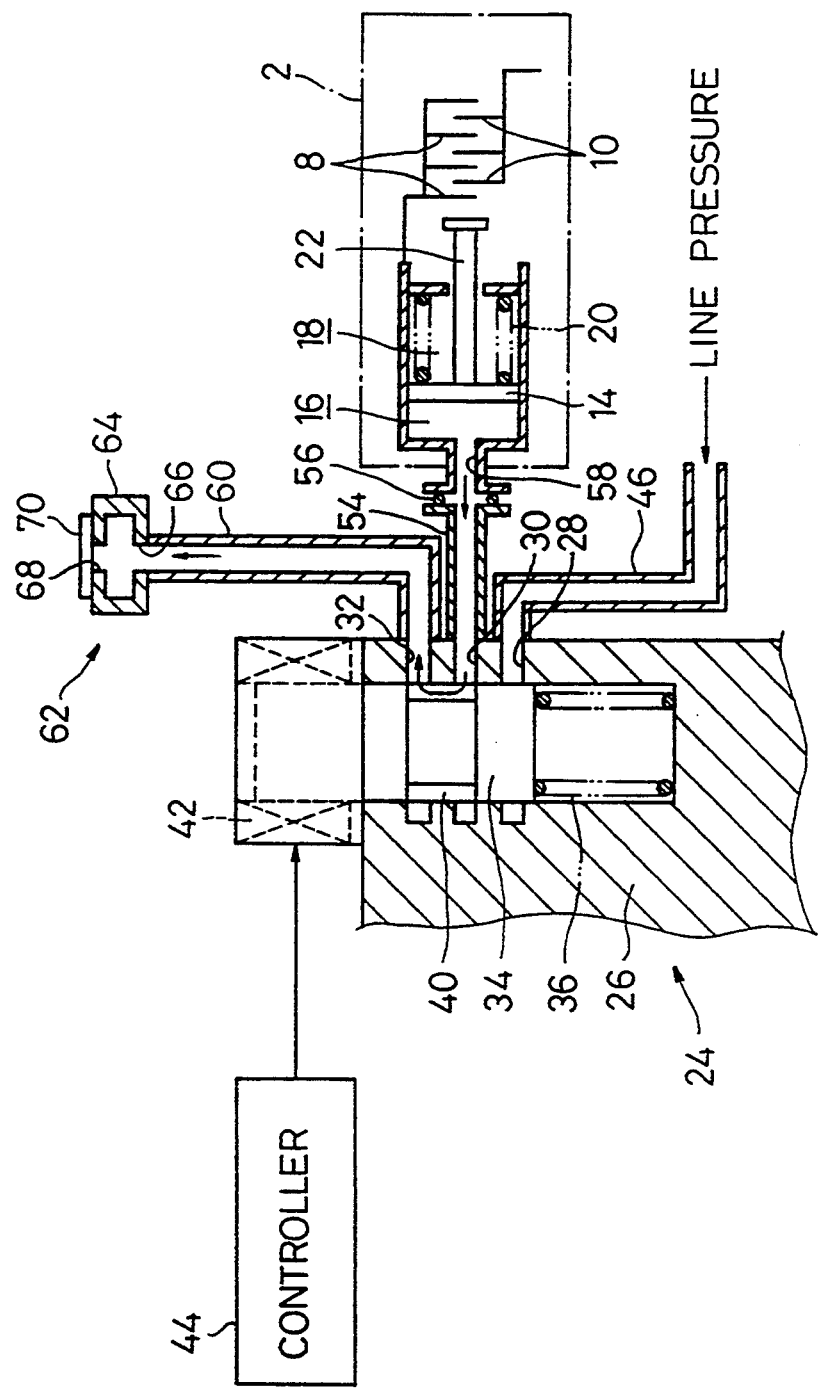
FIG. 5 shows a condition where the drive of the solenoid valve/stopped and the solenoid valve is held in the rest position.

From the state shown in FIG. 1, when the controller 44 drives the solenoid valve 24 at a specified duty ratio, the solenoid valve 24 is periodically switched between the rest position and the actuated position shown in FIG. 4.

When the solenoid valve 24 is switched from the rest position to the actuated position to connect the input port 28 and the output port 30 of the valve body 26, the hydraulic fluid from the hydraulic source 4 is supplied to the pressure chamber 16 of the clutch 2 via the solenoid valve 24, the pressure passage 54 and 58 as shown by the arrow in FIG. 4, thus increasing the pressure in the pressure chamber 16.

On the other hand, when the solenoid valve 24 is switched from the actuated position to the rest position to connect the output port 30 and the discharge port 32 of the valve body 26, the hydraulic fluid on the side of the pressure chamber 16 of the clutch 2 is sent to the discharge passage 60 via the solenoid valve 24, thus decreasing the pressure in the pressure chamber 16. Hence, the pressure in the pressure chamber 16 of the clutch 2 is determined by the time during which the solenoid valve 24 is in the actuated position, i.e., the duty ratio.

When the pressure in the pressure chamber 16 is increased at a predetermined value, the clutch piston 14 moves against the urging force of the return spring 20 to frictionally engage the clutch plates 8 with the clutch discs 10 as previously described.

As soon as the drive of the solenoid valve 24 is stopped, the solenoid valve 24 is held in the rest position and the output port 30 and the discharge port 32 of the valve body 26 are maintained in the connected state. Accordingly, the clutch piston 14 of the clutch 2 is moved in the reverse direction by the urging force of the return spring 20. The movement of the clutch piston 14 causes the frictional engagement between the clutch plates 8 and the clutch discs 10 to be released and also the hydraulic fluid in the pressure chamber 16 to be pushed out toward the valve body 24. The hydraulic fluid pushed out is sent into the discharge passage 60 via the solenoid valve 24.

As it is obvious from the description above, the hydraulic fluid is sent into the discharge passage 60 not only when the drive of the solenoid valve 24 is stopped but also while the solenoid valve 24 is being driven at a specified duty ratio. Hence, the pressure in the discharge route 60 is also increased.

Figure 2:
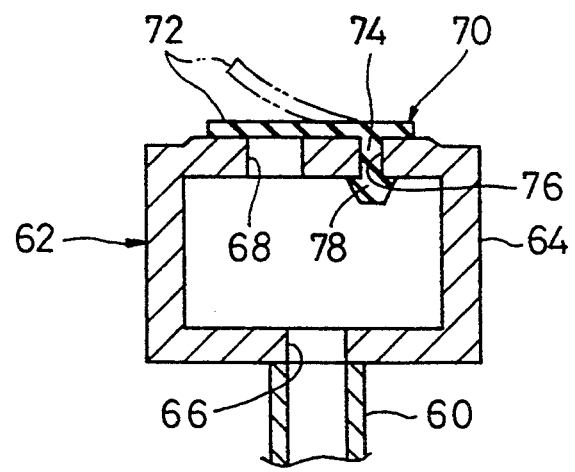
FIG. 2 is an enlarged view of a reed valve which is attached trap box of FIG. 1.

When the pressure in the discharge passage 60 exceeds the shutting force of the above-mentioned reed valve 70, i.e., its opening pressure, the hydraulic fluid In the discharge passage 60 causes the valving element 72 of the reed valve 70 to be elastically deformed upward as shown by two-dot chain line in FIG. 2, thereby pushing the reed valve 70 open. As a result, the hydraulic fluid in the discharge passage 60 overflows through the discharge port 68 of the trap box 64. The hydraulic fluid overflowed is collected into the oil pan 53 of the hydraulic source 4 or it drops and gathers at the bottom of the casing of the automatic transmission.

As soon as the pressure in the discharge passage 60 drops below the opening pressure of the reed valve 70 due to the overflow of the hydraulic fluid, the reed valve 70 closes the discharge port 68 of the trap box 64.

Hence, even if the clutch 2 is not operated for a long period of time, i.e., even if the solenoid valve 24 is held in the rest position for a long time, the trap box 64, the discharge passage 60, the solenoid valve 24, the pressure passages 54 and 58, and the pressure chamber 16 are kept filled with the hydraulic fluid as long as the discharge port 68 of the trap box 64 is closed up by the reed valve 70.

Describing this aspect in more detail, when the discharge port 68 of the trap box 64 is closed by the reed valve 70, the hydraulic circuit from the trap box 64 to the pressure chamber 16 of the clutch 2 is closed. Therefore, the hydraulic Fluid in the trap box 64 is not subjected to atmospheric pressure and as a result, the hydraulic fluid in the path from the trap box 64 to the discharge passage 60 does not fall from its own weight.

This means that the hydraulic fluid is prevented from leaking through the gap between the valve spool 34 and the valve body 26 or through the gap between the clutch retainer 6 and the clutch piston 14 in the clutch 2, or through the sealing 56 installed between the pressure passages 54 and 58.

As described above, with the path extending from the valve body 26 to the pressure chamber 16 of the clutch 2 always filled with the hydraulic fluid, the pressure in the pressure chamber 16 of the clutch 2 is immediately increased to the predetermined value when the solenoid valve 24 is re-driven, leading to improved responsiveness of the clutch 2 in its action. This also ensures stable increase of the pressure in the pressure chamber 16, permitting stable operation of the clutch 2.

Figure 6:
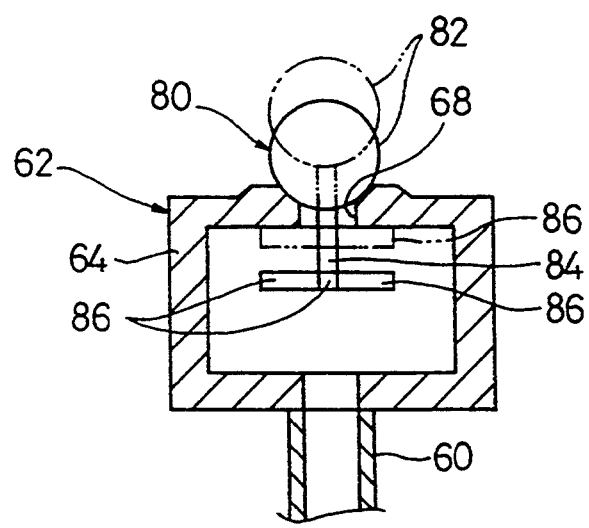
FIG. 6 shows a ball valve which is used in place of the reed valve of FIG. 2.
Figure 7:
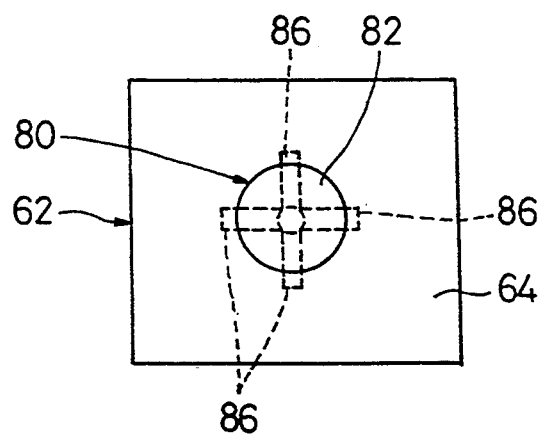
FIG. 7 is a plan view of the ball valve of FIG. 6.

Referring to FIG. 6 and FIG. 7, the hydraulic fluid trap 62 is provided with a ball-shaped check valve 80 which closes the discharge port 68 of the trap box 64 from outside. The ball valve 80 is equipped with a spherical valve element 82, a rod 84 which extends from the valve element 82 into the trap box 64 through the discharge port 68, and four arms 86 which extend horizontally and radially from the bottom end of the rod 84.

In the case of the above-mentioned ball valve 80, when the pressure in the discharge passage 60, i.e. the trap box 64, increases, the hydraulic fluid in the trap box 64 pushes the valve element 82 up as shown by the two-dot chain line in FIG. 6 and overflows through the discharge port 68. At this time, the maximum lift of the valve element 82 is determined by the arms 86 contacting the ceiling of the trap box 64. These arms 86 prevent the valve element 82 from coming off the trap box 64.

As soon as the pressure in the trap box 64 decreases, the valve element 82 falls from its own weight to close the discharge port 68, thus preventing air from coming into the trap box 64.

Figure 8:
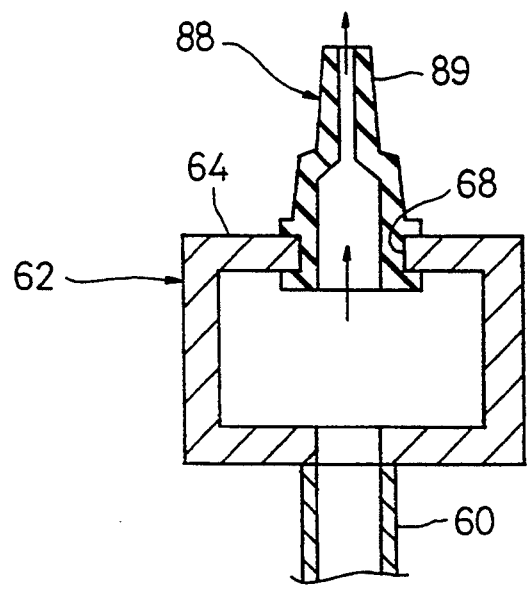
FIG. 8 is a cross-sectional view of a seal tap which is used in place of the reed valve of FIG. 2.
Figure 9:
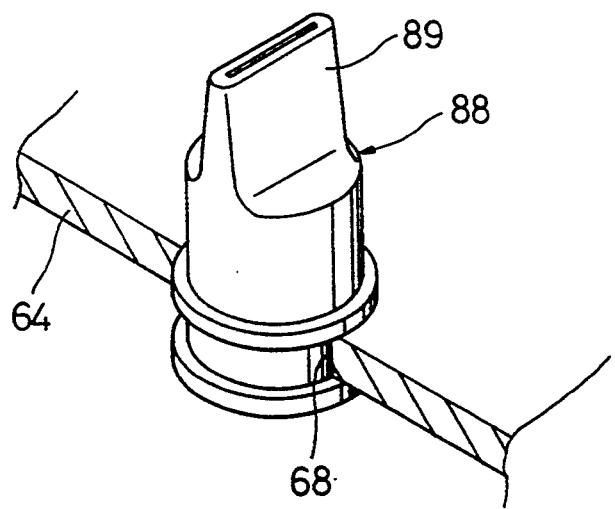
FIG. 9 is a perspective view of the seal tap of FIG. 8.

Referring to FIG. 8 and FIG. 9, the hydraulic fluid trap 62 is equipped with a seal tap 88 which projects from the discharge port 68 of the trap box 64. The seal tap 88 comprises a pipe member which is molded into one piece from an elastic material (e.g., rubber), the bottom end of the seal tap is airtightly inserted in the discharge port 68 and the tip thereof is formed as a valve section 89 which is closed so as airtightly squeeze from both sides in a free state as shown in FIG. 9.

In the case of such a seal tap 88, when the pressure In the trap box 64 increases, the hydraulic Fluid in the trap box 64 elastically deforms the valve section 89 of the seal tap 88 in such a manner that it pushes the valve section open from inside as shown in FIG. 8, thus overflowing through the seal tap 88. On the other hand, when the pressure in the trap box 64 decreases, the valve section 89 of the seal tap 88 closes from its own elastic restoration force, thereby preventing air from coming into the trap box 64.

Figure 10:
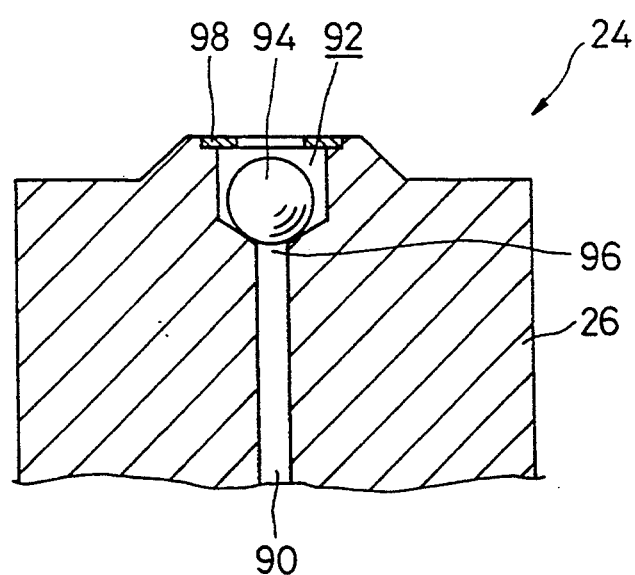
FIG. 10 is a cross-sectional view of the ball valve housed in the valve body of FIG. 1.

Further, referring to FIG. 10, the solenoid valve 24 is provided with a discharge channel 90 in place of the discharge passage 60, the discharge channel 90 being defined in the valve body 26. One end of the discharge channel 90 is connected to the discharge port 32, while the other end is opened to the top surface of the valve body 26. The upper part of the discharge channel 90 is formed as an expansion chamber 92 and the expansion chamber 92 houses a ball valve 94. The ball valve 94 closes a valve port 96 located between the expansion chamber 92 and the discharge channel 90. Further, on the top of the expansion chamber 92 is provided a C ring 98 which prevents the ball valve 94 from slipping off the expansion chamber 92.

In the case of the above-mentioned ball valve 94, the same functions as the reed valve 70, the ball valve 80, and the seal tap 88, which are previously described, are of course provided.

It is also possible to install the seal tap 88 on the top surface of the valve body 26 so that it extends from the expansion chamber 92 instead of incorporating the ball valve 94 in the expansion chamber 92 although this is not shown.

The drawings show only the pressure passages, discharge passage, and solenoid valve, which cooperate with the clutch 2 functioning as a frictional engagement element, However, needless to say, the valve body 26 of the fluid pressure control device incorporates pressure passages and discharge passage, which cooperate with other frictional engagement elements such as clutches and brakes, and other solenoid valves which open and close those passages.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fluid pressure control device for an automatic transmission in a vehicle, the automatic transmission having a frictional engagement element and a reservoir section for storing hydraulic fluid to be supplied to the frictional engagement element, said fluid pressure control device comprising:

supply means for supplying the hydraulic fluid from the reservoir section to the frictional engagement element, said supply means including a supply passage connecting the reservoir section and the frictional engagement element;

a discharge passage, discharging the hydraulic fluid from the frictional engagement element, said discharge passage having a discharge port which is positioned radially upward from a liquid level of the reservoir section;

a change-over valve, selectively connecting one of the supply passage and the discharge passage with the frictional engagement element, said change-over value being located radially upward from the liquid level of the reservoir section; and a check valve, movable in response to hydraulic fluid pressure changes, allowing discharge of the hydraulic fluid only through the discharge port of the discharge passage and preventing air from entering said discharge passage through the discharge port.

2. The device according to claim 1, wherein said check valve includes a reed valve element which closes to prevent air from entering the discharge port and which elastically deforms to open the discharge port, and a mounting portion for receiving the reed valve element.

3. The device according to claim 1, wherein said check valve includes a pipe-shaped seal tap, installed at the discharge port, the seal tap including an elastic member and a valve section, the valve section being deformable to be airtight.

4. The device according to claim 1, wherein the discharge port of said discharge passage opens upward.

5. The device according to claim 4, wherein said check valve includes a spherical valve element which prevents air from entering the discharge port and a foot portion for ensuring that the valve element remains within a predetermined distance from the discharge port.

6. The device according to claim 4, wherein said check valve includes an expansion chamber, provided in said discharge passage, said discharge port contacting a lower surface of the expansion chamber, and a ball-shaped valve element, housed in the expansion chamber, which prevents air from entering the discharge port.

7. The device according to claim 6, wherein said device further includes a valve body, said valve body having an upper surface where said expansion chamber is formed with said discharge passage being defined in said valve body.

8. A fluid pressure control device for an automatic transmission in a vehicle, the automatic transmission having a frictional engagement element and a reservoir section for storing hydraulic fluid to be supplied to the frictional engagement element, said fluid pressure control device comprising:

supply means for supplying the hydraulic fluid from the reservoir section to the frictional engagement element, said supply means having a supply passage which connects the reservoir section and the frictional engagement element;

a discharge passage for discharging the hydraulic fluid from the frictional engagement element, said discharge passage having a discharge port which is positioned at a level radially upward from a liquid level of the reservoir section;

an electromagnetic change-over valve positioned at a level radially upward from the liquid level of the reservoir section, which selectively connects one of the supply passage and said discharge passage with the frictional engagement element, thereby adjusting pressure of the hydraulic fluid supplied to the frictional engagement element, said change-over valve including a supply port which is provided as a part of the supply passage, a discharge port which is provided as a part of said discharge passage, and a valve element which alternately opens and closes the supply port and discharge port; and check valve means for allowing a discharge of the hydraulic fluid only through the discharge port of said discharge passage and for preventing air from entering said discharge passage through the discharge port.

9. The device according to claim 8, wherein said check valve means includes a reed valve element which closes the discharge port to prevent air from entering and which elastically deforms to open the discharge port, and a mounting portion for receiving the reed valve element.

10. The device according to claim 8, wherein said check valve means includes a pipe-shaped seal tap installed at the discharge port, the seal tap including an elastic member and a valve section, the valve section being deformable to be airtight.

11. The device according to claim 8, wherein the discharge port of said discharge passage opens upward.

12. The device according to claim 11, wherein said check valve means includes a spherical valve element, which prevents air from entering the discharge port, and a foot portion for ensuring that the valve element remains within a predetermined distance from the discharge port.

13. The device according to claim 11, wherein said check valve means includes an expansion chamber, provided in said discharge passage, the discharge port contacting a lower surface of the expansion chamber, and a ball-shaped valve element, housed in the expansion chamber, which prevents air from entering the discharge port.

14. The device according to claim 13, wherein said device further includes a valve body, said valve body having an upper surface where the expansion chamber is formed, with said discharge passage being defined in the valve body.

15. The fluid pressure control device of claim 1, wherein the check valve means is moveable between a first and second position, allowing discharge of the hydraulic fluid in the first position and preventing air from entering the discharge passage through the discharge port in the second position.

16. The fluid pressure control device of claim 1, wherein the supply passage and the discharge passage are disposed in a direction parallel to gravitational forces of the earth.

17. The fluid pressure control device of claim 16, wherein the check valve means constantly maintains a minimum pressure in the supply passage and discharge passage to constantly maintain hydraulic fluid in the supply passage and discharge passage.

18. The fluid pressure control device of claim 15, wherein the check valve means moves in response to changes in hydraulic fluid pressure and constantly maintains a minimum amount of hydraulic fluid pressure in the supply and discharge passages so as to constantly maintain hydraulic fluid in the supply and discharge passages.

19. A fluid pressure control method for an automatic transmission in a vehicle, the automatic transmission including a frictional engaging element and a reservoir section for storing hydraulic fluid to be supplied to the frictional engaging element, the fluid pressure control method comprising the steps of:

(a) supplying hydraulic fluid from the reservoir section to the frictional engaging element through a supply passage;

(b) discharging hydraulic fluid from the frictional engaging element through a discharge passage;

(c) selectively controlling the opening of one of said supply passage and discharge passage and the closing of the other of said supply passage and discharge passage and thereby varying pressure of the hydraulic fluid in the supply passage and discharge passage;

(d) discharging hydraulic fluid from a discharge port of the discharge passage in response to an increase in the pressure of the hydraulic fluid in the discharge passage; and (e) sealing the discharging passage and maintaining a minimum amount of hydraulic fluid pressure in the discharge passage in response to a decrease in the pressure of the hydraulic fluid in the discharge passage to thereby ensure the constant presence of hydraulic fluid in the supply passage and discharge passage.

20. The fluid pressure control method of claim 19, wherein step (e) includes the substep of sealing the discharge port of the discharge passage to prevent air from entering the discharge passage.

21. The fluid pressure control method of claim 19, wherein step (d) includes the substep of elastically deforming an element connected to the discharge port in response to the increase in hydraulic fluid pressure in the discharge passage.

22. The fluid pressure control method of claim 21, wherein step (e) includes the substep of elastically deforming the element connected to the discharge port, in a direction opposite to that of the elastic deformation of step (d), in response to the decrease in hydraulic fluid pressure in the discharge passage.

23. The fluid pressure control method of claim 19, wherein step (d) includes the substep of displacing an element blocking the discharge port in response to an increase in hydraulic fluid pressure in the discharge passage.

24. The fluid pressure control method of claim 23, wherein in step (e), the previously displaced element blocks the discharge port to maintain a minimum of hydraulic fluid pressure in the discharge passage in response to a decrease in hydraulic fluid pressure in the discharge passage.

25. A fluid pressure control device for an automatic transmission in a vehicle, the automatic transmission including a frictional engaging element and a reservoir section for storing hydraulic fluid to be supplied to the frictional engaging element, the fluid pressure control device comprising:

a supply passage, supplying hydraulic fluid from the reservoir section to the frictional engaging element;

a discharge passage, discharging hydraulic fluid from the frictional engaging element;

a first means for selectively varying pressure of the hydraulic fluid in the supply passage and in the discharge passage; and check valve means, in response to an increase in hydraulic fluid pressure in the discharge passage, for allowing discharge of hydraulic fluid from a discharge port of the discharge passage and, in response to a decrease in hydraulic fluid pressure in the discharge passage, for sealing the discharge passage and maintaining a minimum amount of hydraulic fluid pressure in the discharge passage to thereby ensure the constant presence of hydraulic fluid in the supply passage and discharge passage.

26. The fluid pressure control device of claim 25, wherein the check valve means moves to a first position in response to an increase in hydraulic fluid pressure in the discharge passage and moves to a second position in response to a decrease in hydraulic fluid pressure in the discharge passage.

27. The fluid pressure control device of claim 26, wherein the check valve means includes a spherical portion for sealing the discharge port of the discharge passage in the second position, and a foot portion for ensuring that the spherical portion does not exceed a predetermined maximum distance from the discharge port in the first position.

28. The fluid pressure control device of claim 25, wherein the check valve means includes an elastically deformable element.

29. The fluid pressure control device of claim 28, wherein the elastically deformable element deforms in a first direction in response to an increase in hydraulic fluid pressure to allow for the discharge of hydraulic fluid from the discharge passage and deforms in a second direction in response to a decrease in hydraulic fluid pressure to create an airtight seal of the discharge passage.

30. The fluid pressure control device of claim 29, wherein the check valve means includes a relatively wide base portion closest to the discharge passage, and a relatively narrow neck portion, the relatively narrow neck portion including an opening at an end furthest from the wide base portion.

31. The fluid pressure control device of claim 25, wherein the first means alternately opens one of the supply passage and the discharge passage and closes the other of the supply passage and the discharge passage.

32. The fluid pressure control device of claim 25, wherein the first means includes a controllable valve.

33. The fluid pressure control device of claim 32, wherein the supply passage includes a portion extending between the reservoir section and the valve and a portion extending between the frictional engaging element and the valve, the discharge passage includes a portion extending from the frictional engaging element and the valve and a portion extending between the valve and the discharge port, and the valve includes a groove which is selectively part of one of the discharge passage and supply passage.

34. The fluid pressure control device of claim 33, wherein the valve is a solenoid controlled valve, and wherein the valve moves between a first and second position to selectively open one of the discharge passage and supply passage, respectively.

35. The fluid pressure control device of claim 34, wherein at least a portion of the supply and discharge passages are formed in a direction parallel to gravitational forces of the earth.

36. The fluid pressure control device of claim 35, wherein the frictional engaging element is disposed radially upward from the reservoir section and the discharge port is disposed radially upward of the frictional engaging element.

37. The fluid pressure control device of claim 34, wherein the solenoid is controlled by a predetermined duty ratio.

* * * * *